United States Patent [19]

Daugherty

[11] Patent Number: 4,500,141

[45] Date of Patent: Feb. 19, 1985

[54] DRILL STEEL IDLER GUIDE

[76] Inventor: Estes M. Daugherty, 2804 Mimosa Dr., Sherman, Grayson County, Tex. 75090

[21] Appl. No.: 417,603

[22] Filed: Sep. 13, 1982

[51] Int. Cl.³ .............................................. F16C 31/04
[52] U.S. Cl. ................................... 308/4 R; 308/6 R
[58] Field of Search .............. 308/6 R, 4 R, 4 A, 6 A; 277/174; 175/325

[56] References Cited

U.S. PATENT DOCUMENTS

| 334,523 | 1/1886 | Frizell | 277/174 |
|---|---|---|---|
| 1,098,724 | 6/1914 | Hartman et al. | 308/3 |
| 2,881,644 | 4/1959 | Conner . | |
| 2,983,553 | 5/1961 | Dexter | 308/6 |
| 3,003,830 | 10/1961 | Blazek | 308/6 |
| 3,301,102 | 1/1967 | De Lara . | |
| 3,674,324 | 7/1972 | Schweizer et al. | 308/6 |
| 3,951,470 | 4/1976 | McLean . | |

OTHER PUBLICATIONS

Barber Industries; "Barber Rotary Deck Bushings"; Bulletin, 1900.

Primary Examiner—Lenard A. Footland
Attorney, Agent, or Firm—Richards, Harris & Medlock

[57] ABSTRACT

An idler guide for a rotary drilling rig has a plurality of spring-loaded floating bearings along the inside wall of a cylindrical bearing member for stabilizing and guiding the rotational and axial movement of drill pipe through the guide. The floating bearings are spring-loaded to move inwardly or outwardly along the radius of the cylindrical bearing to accommodate both new and worn drill steel pipe. The bearings are free to rotate with any resultant combination of axial or rotational movements of the drill steel. Individual bearing members may be replaced through the exterior wall of the idler guide. A floating ring in the bottom of the idler guide deflects drilling fines from entering in the gap between the inside of the guide and the outside of drill pipe.

2 Claims, 6 Drawing Figures

DRILL STEEL IDLER GUIDE

TECHNICAL FIELD

The present invention pertains to an idler guide and more particularly to an idler guide for guiding the axial and rotational movement of drill steel in a rotary drilling apparatus.

BACKGROUND ART

Rotary drilling rigs are utilized for drilling a vertical shaft in the earth in search of minerals, water or petroleum products located beneath the surface. The typical rotary drilling rig is a self-contained drilling apparatus which may be transported to the job site. A rotary drilling rig has an upright vertical mast section, a rotary drive unit located at the top of the mast, and means for raising and lowering the drill steel into the drill hole. The drill steel is hollow and the drill bit includes nozzle openings to allow air to be directed through the drill steel to force drilling fines up and out of the drill hole.

An idler guide is located at the base of the rotary drilling rig where the drill steel passes through the bottom mast plate. The guide stabilizes the string of drill steel between the top drive and the drill bit during the drilling operation. The drill steel is subject to wear from the friction produced between the drill steel and the inside of the idler guide as well as the sandblasting effect from the drilling fines blown upwardly and out through the drill hole. The drilling fines may cause increased wear by lodging between the drill steel and the inside of the idler guide. In addition, the entire length of the drill steel in the drill hole is subjected to the sanding effect from the chips and drilling fines blown out of the hole. Since the velocity of the drilling fines decrease as they travel upward through the drill hole, the pipe is caused to wear unevenly. The drill steel outside diameter tapers with the greatest wear occurring on the drill steel located closest to the drill bit. The unevenly worn drill steel and idler guide must be replaced in order for the idler guide to function properly to stabilize the drill steel, reduce noise and reduce the frictional forces on the pipe passing through the bottom of the drill mast.

The typical prior art idler guide has an inner cylindrical sleeve supported for rotation within an outer cylindrical sleeve. Ball bearings are fitted in grooves between the two cylindrical sleeves. The inner sleeve has a central bore through which the drill steel passes. The typical idler guide does not provide any bearing surface for the axial movement of the drill steel pipe, and there is no means for adjusting unevenly worn drill pipe. In prior art idler guides, drilling fines may lodge between the inside diameter of the idler guide and the outside diameter of the drill pipe.

A need has thus arisen for an improved idler guide for reducing the frictional wear from movement of the drill pipe within the idler guide, stabilizing and guiding both new and unevenly worn or tapered drill pipe, and reducing the frictional wear caused by drilling fines lodging between the idler guide and drill pipe.

DISCLOSURE OF THE INVENTION

In accordance with the present invention, an improved drill steel idler guide reduces the wear on drill steel and improves the stabilization of the drill steel, particularly unevenly worn sections of drill steel pipe. An elongated hollow core cylindrical member has a top plate attached to one end for mounting the idler guide to the drilling mast platform. A plurality of spring-loaded floating bearings are spaced about the interior wall of the cylindrical member for engaging the outside walls of the drill steel section received within the cylinder.

The floating bearings may be of any suitable shape to reduce the friction caused by the rotational and axial movement of the drill steel through the cylinder. One embodiment of the invention includes a spherical bearing member which is free to rotate in any direction caused by the drill steel pipe moving axially up or down through the cylinder or rotating circumferentially around the cylinder under the action of the rotary gear drive. In another embodiment of the invention, the floating bearings are cylindrical rollers mounted for rotation in circular housings so that the bearing may rotate in any direction to accommodate the combined rotational and axial movement of the drill pipe. The antifriction bearings, spherical or caster type cylindrical rollers, are spring-loaded such that the bearings extend radially inwardly beyond the interior wall of the cylindrical member to engage drill steel, even worn drill steel with a varying outside diameter less than that of new pipe. The floating bearing retracts sufficiently to accommodate new pipe having an outside diameter substantially that of the inside diameter of the cylindrical bushing.

In yet another aspect of the present invention, the individual floating bearings are fitted through openings in the wall of the cylindrical housing, such that the individual bearings when worn may be quickly replaced from the exterior of the cylindrical bushing.

In yet another aspect of the present invention, a removable floating ring is positioned on the drill hole side of the cylindrical bushing for deflecting drilling fines from the interior of the cylindrical bushing.

BRIEF DESCRIPTION OF DRAWINGS

A more complete understanding of the present invention and its advantages will be apparent from the following Detailed Description taken in conjunction with the accompanying Drawings in which.

DETAILED DESCRIPTION

Figure 1:
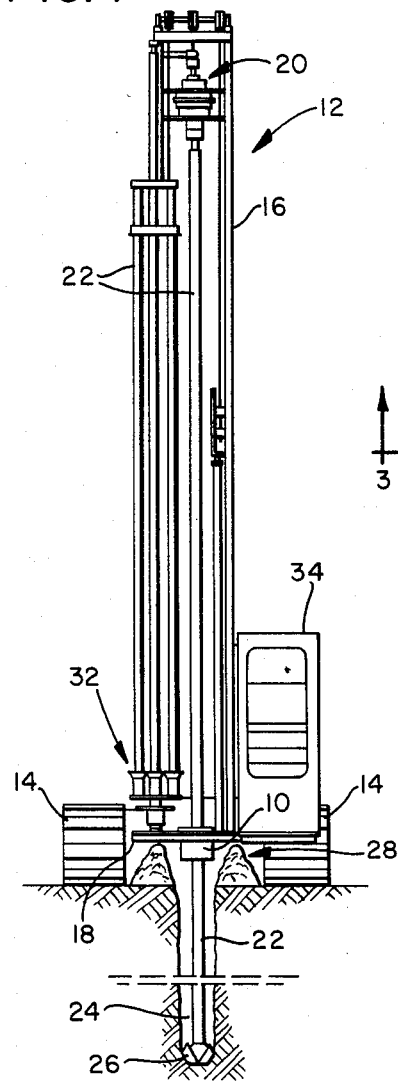
FIG. 1 is a side elevational view of a rotary drilling rig utilizing the idler guide of the present invention.

FIG. 1 illustrates an idler guide of the present invention, generally identified by the reference numeral 10, used on a typical rotary drilling rig, identified by the reference numeral 12. The rotary drilling rig 12 is mounted upon a pair of endless metal tracks 14 for moving the rig 12 to the drilling site. A mast assembly 16 is illustrated raised in an upright vertical position upon a mast platform 18. The mast assembly 16 may be lowered to a horizontal position when transporting the drilling rig 12. Hydraulic jacks (not illustrated) are located in the front and rear of the drilling rig 12 and may be lowered when the rig 12 is aligned over a drilling site to stabilize the drilling rig 12.

A hoist-pulldown rotary drive unit 20 is mounted for vertical movement up and down the mast assembly 16, and it is illustrated in the uppermost position. The rotary drive unit 20 imparts a rotary motion to a length of drill steel pipe 22 and raises and lowers the drill steel 22. The length of drill steel 22 connected to the rotary drive unit 20 is connected to other lengths of drill steel 22 extending into a drill hole 24. A rotary drill bit 26 attached to the first drill steel 22 is rotated to form the drill hole 24. The drill steel 22 is hollow to allow a fluid, normally air, to be directed down the length of drill steel 22 extending into the drill hole 24 and out the drill bit 26. The drilling fines are forced out of the drill hole 24 and form an accumulation 28 of the drilling fines. A pipe rack carousel 32 is located next to the mast assembly 16 for holding sections of drill steel 22 to be added to or removed from the string of drill steel sections 22. A control cab 34 is positioned on the drilling rig 12 to enable an operator to see and control the drilling operation.

The idler guide 10 is mounted on the mast platform 18 and stabilizes the drill steel 22 between the rotary drive unit 20 and the drill bit 26. The idler guide 10 also acts as a bearing to reduce the frictional forces associated with the rotational and axial movement of the drill steel 22 under the control of the hoist/pulldown rotary drive unit 20.

Figure 2:
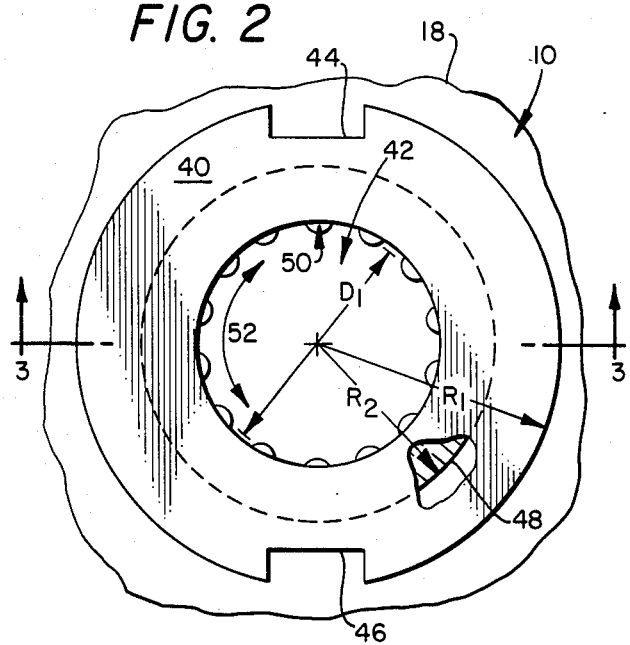
FIG. 2 is a plan view of the idler guide of the preferred embodiment of the present invention.

FIG. 2 illustrates a plan view of the idler guide 10 of FIG. 1 mounted on the mast platform 18. An annular top plate 40 has a central annulus 42 with a diameter greater than the outside diameter "$D_1$" of a nominally sized new drill pipe 22. The annular plate 40 includes a pair of notches 44 and 46 for stabilizing and securing the idler guide 10 to the mast platform 18. The diameter of the annulus 42 of annular plate 40 is equal to the inside diameter of the cylindrical member 48, shown in phantom in FIG. 2. The radial section "$R_1$" of the annular plate 40 is greater than the radial section "$R_2$" of the cylindrical bearing 48. The annular plate 40 may be joined to the cylindrical 48 by any suitable means, such as welding, and is mounted upon the upper plate of the mast platform 18. The cylindrical member 48 extends through the mast platform 18, as illustrated in FIG. 1. A plurality of spring-loaded floating bearing members 50 are positioned about the interior of the cylindrical member 48 for reducing the frictional resistance encountered when a section of drill steel 22 is moved axially through the idler guide 10 in a direction in and out of the plane of the drawing, or rotated clockwise or counterclockwise in the plane of the drawing, as indicated by the double headed arrow 52.

Figure 3:
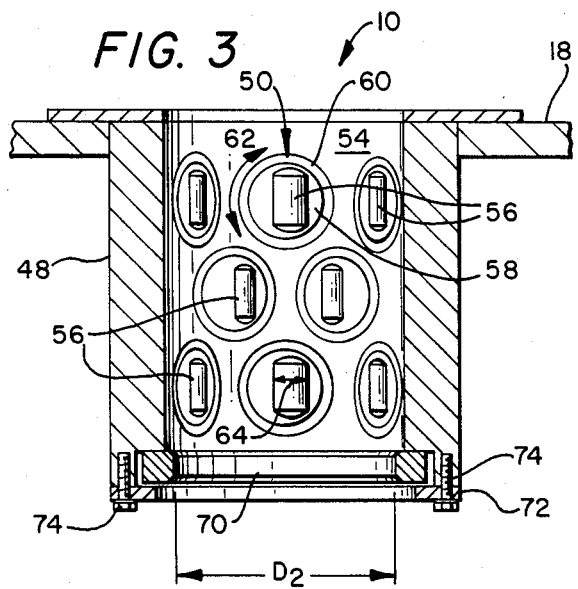
FIG. 3 is a cross-sectional side view of the idler guide of FIG. 2 taken along the lines 3—3.

FIG. 3 is a cross-sectional view of the idler guide 10 taken along the lines 3—3 of FIG. 2. The spring-loaded floating bearings 50 illustrated are spaced along the inside wall 54 of the cylindrical member 48. Each of the spring-loaded floating bearings 50 includes a cylindrical roller 56 mounted for rotation in a circular housing 58. The center of the cylindrical roller 56 is offset from the center of the circular housing 58 to allow the housing 58 to rotate more freely. The circular housing 58 is mounted within annular bearing housing 60 within the inner wall 54 of the cylindrical member 48. The circular housing 58 is free to rotate clockwise or counterclockwise 360° as indicated by the double headed arrow 62. The cylindrical roller 56 is in turn free to rotate 360° about its axis in either direction as indicated by the double headed arrow 64.

The spring-loaded floating bearings 50 are oriented in FIG. 3 for these cylindrical rollers 56 to turn with the rotational movement of a section of drill steel 22 within the cylindrical bearing 48. Axial movement of the drill steel through the cylindrical bearing 48 would cause the off-centered cylindrical rollers 56 to rotate 90° in either direction as indicated by arrows 62 to follow and reduce the direction of axial forces produced by the axial movement of the drill steel 22. Of course, the floating bearings 50 may be rotated to follow any resulting movement that is caused by the combination of the rotational and axial components of the rotational and axial movement of the drill steel through the cylindrical member 48.

A floating deflection ring 70 is removably secured to the bottom of the cylindrical member 48. The floating ring 70 is removably secured to the cylindrical bearing 48 by means of a cover plate 72 held by a plurality of bolts 74 to the cylindrical member 48. The floating ring 70 may be constructed of any suitable material, such as steel, and its inside diameter "$D_2$" is dimensioned to be substantially equal to the normal outside diameter of drill steel pipe 22 received within the cylinder 48. The floating ring 70 reduces the drilling fines 28 entering the cylindrical member 48 which would increase the wear on the drill steel 22 and bearings 50.

Figure 4:
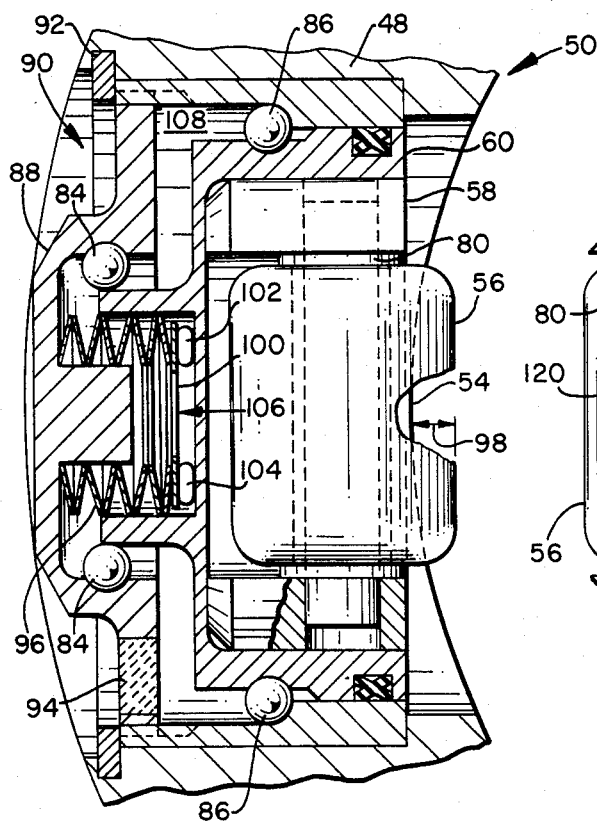
FIG. 4 is an enlarged top cross-sectional view of the floating cylindrical roller bearing illustrated in FIG. 3, where the roller is rotated 90° in phase.

FIG. 4 is an enlarged cross-sectional view of one of the floating bearings 50 in FIG. 3, in which the cylindrical roller 56 is rotated 90° in phase. The cylindrical roller 56 is supported for rotation upon a shaft 80 journaled within the rotatable circular housing 58. The rotatable circular housing 58 is attached for rotation within the annular bearing housing 60 and is supported for rotation by first and second set of ball bearings 84 and 86. The annular bearing housing 60 rotates upon the first and second set of ball bearings 84 and 86 within bearing frame 88. The bearing frame 88 is held in place through an opening 90 in the cylindrical member 48 by a locking ring 92. A breather 94 is inserted within an opening in the outer wall of the bearing frame 88. A spring means 96 is fitted between the backwall of the bearing frame 88 and the annular bearing housing 60 to maintain the cylindrical roller bearing 56 in the normal position extending a predetermined distance 98 beyond the interior wall 54 of the cylindrical member 48. The spring means 96 is compressed by an annular ring 100 and a pair of thrust bearings 102 and 104. The spring means 96 is compressed in the direction indicated by the arrow 106 from the outward force of a drill steel section 22 having an outside diameter greater than that of the distance between opposing cylindrical roller bearings 56. The cylindrical roller bearing 56 may be compressed substantially flush with the inner wall of the cylindrical bearing 48, as the annular bearing housing 60 moves into the air gap 108 between the annular housing 60 and the bearing frame 88. The breather 94 prevents air lock up of the floating bearing 50.

Figure 5:
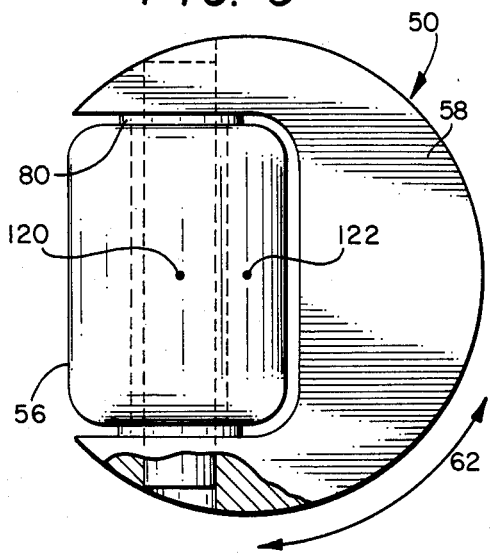
FIG. 5 is an enlarged frontal view of a roller bearing of FIG. 3.

FIG. 5 illustrates a frontal view of a portion of the floating bearing 50 of FIG. 3. The cylindrical roller 56 is journaled upon the shaft 80 in the circular housing 58. The center 120 of the rotation of the cylindrical bearing 56 is offset from the center 122 for the circular housing 58. Circular housing 58 may rotate about the center point 122 in either the clockwise or counterclockwise direction as indicated by the double headed arrow 62.

Figure 6:
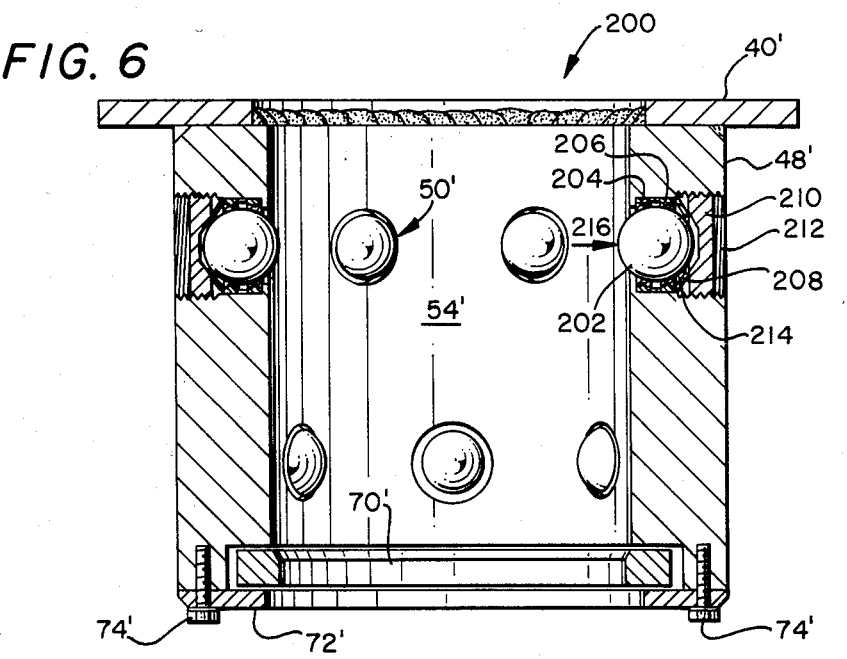
FIG. 6 is a cross-sectional side view of an alternate embodiment of the present invention, utilizing spring-loaded spherical floating bearings.

FIG. 6 illustrates an alternate embodiment of the present invention, generally identified by the reference numeral 200. Many of the component parts of the idler guide 200 are substantially identical in construction and function to component parts of the idler guide 10. Such identical component parts are designated in FIG. 6 with the same reference numerals utilized hereinbelow in the description of the idler guide 10, but are differentiated therefrom by means of a prime (') designation. An annular plate 40' is welded to a cylindrical member 48' to support the idler guide 200 on the mast platform. A plurality of floating bearings 50' are positioned about the interior wall 54' of the cylindrical member 48' to provide a bearing surface for a drill section 22 under both components of axial and rotational movement. A floating ring 70' is held in position at the bottom of the cylindrical member 48' by an annular plate 72' and plurality of bolts 74'. The interior dimension of the floating ring 70', which may be constructed of any suitable material, such as steel, is less than the inside diameter of the cylindrical member 48'. The inside diameter of the floating ring 70' is approximately that of the normal outside diameter of a drill section 22 in order to prevent debris such as drilling fines exiting from the borehole from being blasted into the space between the drill steel 22 and the cylindrical member 48'.

The floating bearings 50' include a spherical bearing member 202 positioned for rotation within a pair of annular rings 204 and 206, which may be constructed of any material having a low coefficient of friction, such as Teflon. The annular rings 204 and 206 are illustrated in the normal position with the spherical bearing 202 extending a predetermined distance beyond the interior wall of the bearing 48' by a spring member 208 and a metal base plate 210, threaded into a passageway 212 extending between the exterior and interior wall of the cylindrical bearing member 48'. The spherical bearings 202 of the floating bearings 50' define a distance between opposing bearings to engage the outside diameter of a worn steel drill section 22, while the distance 214 between the annular ring 206 and base plate 210 allow the ball bearings 202 to move outwardly in the direction indicated by arrow 216 to accommodate the outside diameter of a new drill steel 22. The base plates 210 allow individual roller bearings 50' to be replaced individually.

While the idler guide of the present invention has been described in detail herein, it will be evident that various and further modifications are possible without departing from the scope and spirit of the present invention.

I claim:
1. An idler guide for supporting drill pipe in a rotary drilling rig, comprising:
   an elongated cylindrical member having a central cylindrical opening formed therethrough for receiving the drill pipe, said cylindrical opening having an inside diameter greater than the outside diameter of the drill pipe;
   means for affixing said cylindrical member to the rotary drilling rig;
   a plurality of rotatable bearing surfaces aligned along the inside wall of said cylindrical member, said bearing members projecting inwardly beyond the interior wall of said cylindrical member, said bearing members projecting inwardly beyond the interior wall of said cylindrical member for engaging the drill pipe for reducing the frictional forces on the drill pipe moving in said cylindrical member, said bearing surfaces being adapted to rotate freely with any combination of axial or rotational movement of drill steel in the idler guide; and
   said bearing surfaces being cylindrical rollers mounted in rotatable housings along the interior wall of said cylindrical member.
2. An idler guide for supporting drill pipe in a rotary drilling rig, comprising:
   an elongated cylindrical member having a central cylindrical opening formed therethrough for receiving drill pipe, said cylindrical opening having an inside diameter greater than the outside diameter of the drill pipe;
   means for affixing said cylindrical member to the rotary drilling rig;
   a plurality of rotatable bearing surfaces along the side wall of such cylindrical member;
   spring means for forcing said rotatable bearing surfaces to extend a predetermined distance beyond the inside wall of said cylindrical member, said spring means allowing said bearing surfaces to move outwardly to increase the distance between opposing bearing surfaces, whereby said bearing surfaces provide axial and rotational support for drill pipe having varying outside diameters resulting from the uneven wear of drill pipe; and
   means for deflecting drilling fines from entering the space between the outside diameter of the drill pipe and the inside diameter of such cylindrical member reducing the wear on the drill pipe.

* * * * *